June 19, 1973 W. J. LANDEN Re. 27,673

BOTTLE SAFETY CLOSURE

Original Filed April 17, 1970

INVENTOR

William J. Landen

BY DeLio and Montgomery

ATTORNEYS

United States Patent Office

Re. 27,673
Reissued June 19, 1973

27,673
BOTTLE SAFETY CLOSURE

William J. Landen, Cheshire, Conn., assignor to Eyelet Specialty Company, Wallingford, Conn.

Original No. 3,567,057, dated Mar. 2, 1971, Ser. No. 29,400, Apr. 17, 1970. Application for reissue Dec. 29, 1971, Ser. No. 213,759
Int. Cl. B65d *55/02*
U.S. Cl. 215—9 23 Claims

Matter enclosed in heavy brackets [ ] appears in the original patent but forms no part of this reissue specification; matter printed in italics indicates the additions made by reissue.

ABSTRACT OF THE DISCLOSURE

This disclosure relates to a safety cap for a bottle which may contain hazardous material and which is simple for an adult to open, but essentially impossible for a child of limited strength to open.

This invention relates to bottles adapted to contain hazardous substances, and more particularly relates to safety closures for such bottles which render them unopenable by persons of limited strength.

The hazard of many substances to human life, particularly to small children, is widely recognized. For this reason there have been many suggestions of providing safety closure caps for bottles. The present invention provides a bottle closure cap which is very simple for an adult to remove but will be impossible for a child of limited strength to open and gain access to its contents. The closure assembly provided by the present invention is further arranged so that it is adapted for automatic filling of the bottle and assembly of the caps thereto. It is economical to manufacture and would thus minimize any additional cost to the buyer for the improved safety construction.

Briefly stated, the invention is one form thereof comprises a a bottle member having a resilient means disposed about its neck which is engaged by a locking member. The locking member and a closure cap are so constructed that when the cap is put on the bottle the locking member is urged against the resilient member which, in turn, biases the locking member into interlocking engagement with the cap. With this arrangement, the locking member must be withdrawn from engagement with the cap before the cap can be removed. By selection of various parameters, the force necessary to remove the locking member from interlocking engagement with the cap may be predetermined, and the assembly may be rendered unopenable by a child.

Accordingly, it is an object of this invention to provide a new and improved safety cap for a bottle.

Another object of this invention is to provide a new and improved safety cap for a bottle which is economical to manufacture and readily lends itself to automatic production line facilities for filling and capping a bottle.

A further object of this invention is to provide a new and improved safety cap and bottle combination in which the cap is readily locked onto the bottle but may be unlocked therefrom by a very simple manipulation of a locking member.

The features of the invention which are believed to be novel are particularly set forth and distinctly claimed in the concluding portion of this specification. However, the invention both as to its organization and operation, together with further objects and advantages thereof may best be appreciated by reference to the following detailed description taken in conjunction with the drawings, wherein:

Figure 1:
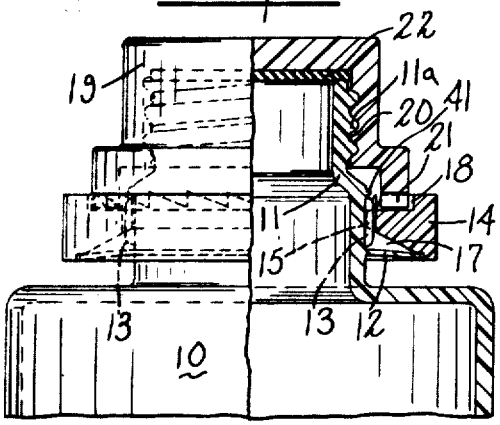
FIG. 1 is a view in half section of an upper portion of a bottle and safety cap therefor embodying the invention.
Figure 2:
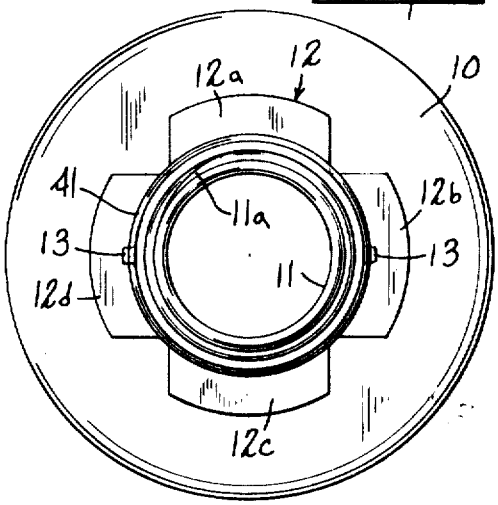
FIG. 2 is a view looking down on the bottle of FIG. 1 with the cap and locking member removed.
Figure 3:
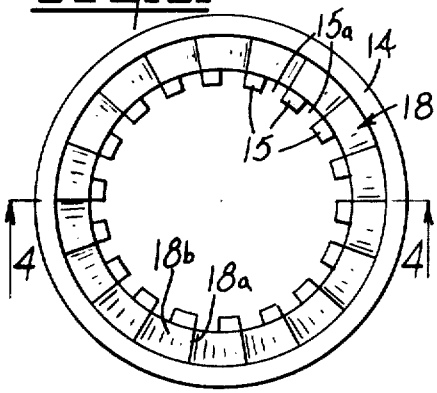
FIG. 3 is a top plan view of the locking member of FIG. 1.
Figure 6:
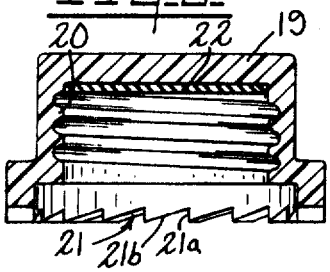
FIG. 6 is a view in section of the cap of FIG. 5 seen in the plane of lines 6—6 of FIG. 5.
Figure 5:
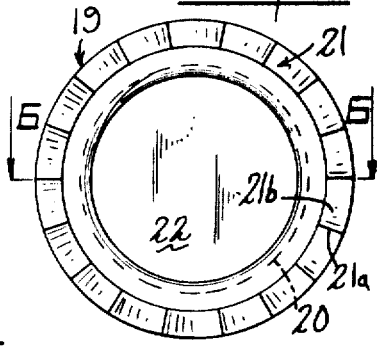
FIG. 5 is a view of the bottle cap of FIG. 1 seen from the underside thereof.

The invention as applied to a nonvitreous bottle is shown in FIG. 1 and comprises a bottle 10 of nonvitreous material such as a plastic material formed from a blow molding process to define the bottle 10. The bottle 10 includes a neck portion *or member* 11 having threads 11a defined on the upper portion thereof. Extendnig from neck portion 11 is [a] resilient biasing [member] means in the form of a flangelike member 12. The flange member 12 may be completely circular or as shown in FIG. 2 may be divided into segments **12*a*, 12*b*, 12*c* and 12*d*. Also defined on neck 11 are splines or protruding detent members 13**.

A locking member 14 is adapted to fit over the neck 11 of bottle 10 and be locked in an angular position by the splines 13. For this purpose, member 14 is formed with inwardly directed detent members or splines 15 which define spaces 15a therebetween. With this arrangement locking member 14 may be simply dropped over the neck of bottle 11 in an automatic processing line and will be self-seating in that the splines 13 will be received in any of spaces 15a. To facilitate this assembly, the bottom portions of the detents 15 may be rounded or made on a taper (not shown) so member 14 will readily seat itself around neck portion 11 in engagement with splines 13.

Figure 4:
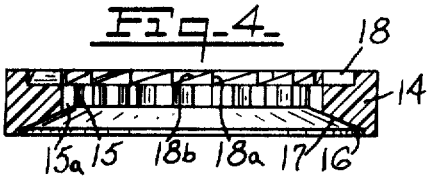
FIG. 4 is a view seen in the plane of lines 4—4 of FIG. 3.

As more clearly shown in FIG. 4, member 14 is defined with an undercut shoulder 16 adapted to fit over *and thus axially reference the radially outer limit of* flange member 12, [and] the under portion thereof [is] *being* further defined with a generally concave recess exemplified by a tapered or frustoconical surface 17 for reasons hereinafter made apparent. Defined on the upper portion of locking member 14 is an annulus of ratchetlike teeth 18 adapted to be placed in locking engagement with a cap member 19.

Cap member 19 has internal threads 20 defined thereon adapted to threadably receive threads 11a on neck 11. Defined on the underside of cap 19 is an annulus of ratchetlike teeth 21 adapted to interlock with teeth 18.

In operation, when the bottle 10 is filled with the locking member 14 disposed thereon, the cap 19 is then screwed on to the neck 11 until a sealing member 22 on the undersurface of the top of the cap engages the top edge of neck 11. *Otherwise stated, cap 19 is fully threaded onto neck 11.* As this occurs, the ratchetlike teeth 21 of cap 19 may slip on the ratchetlike teeth 18 of locking member 14. This will force member 14 downwardly on biasing member 12 which will be deformed or biased downwardly as shown in FIG. 1. When cap 19 is threaded onto neck 11, the upward bias of the resilient biasing member against member 14 will urge member 14 into interlocking engagement with cap 19 and the vertical edges 18a and 21a of ratchetlike teeth will prevent removal of cap 19.

Cap 19 can only be released when the interlocking ratchet teeth 18 and 21 are removed from engagement. This is achieved by applying a downwardly directed force as represented by the arrow F in FIG. 7 to locking member 14, which downwardly directed force against the resilient flange 12 will move locking member 14 downwardly and disengage the teeth 18 and 21, thus permitting the cap 19 to be easily threaded off of neck 11.

When the desired member or volume of contents have been removed from bottle 10, an adult may then easily provide locking closure again by threading cap 19 back onto threads 11a until the cap bottoms on the neck. During a portion of such operation, the teeth 21 will slip on the teeth 18 by virtue of the inclined surfaces 21b and 18b, locking member 14 will then urge flange member 12 downwardlly which, in turn, will exert an upward bias on member 14 urging it into interlocking engagement with cap 19. The recessed or tapered surfaces 17 of locking member 14 permit locking member 14 to act on the edges of flanges 12 and urge the flanged member downwardly while moving downwardly with respect thereto. It will be apparent that such a recess will be necessary to act on the edges of the flange and bend it downwardly.

The magnitude of the force F necessary to release the member 14 from locking engagement with cap 19 may be predetermined by the resilience of the material 12, the configuration of the resilient biasing member, that is, if it is a flange, whether segmented or a complete disc, and the radial size of the biasing member, together with other parameters. These parameters may be chosen in accordance with the degree of force that it is desired to exert on the locking member 14 before opening of the bottle is permitted.

In a preferred form of the invention which uses nonvitreous material and in which the flange member 12 may be formed integrally with the bottle neck, a suitable material for forming the bottle is polypropylene and a particular designation is Type 220 of Dow Chemical Company. This type of material may be utilized where it is desired to have a bottle of inert material which is readily adapted for high volume manufacturing purposes. It is to be understood, of course, that many other materials may be utilized for the bottle, the only requirement being that the biasing member or flange 12 have the desired degree of resilience and flexibility.

It will be noted that from the foregoing, once locking engagement is achieved and the sealing member 22 rests on the upper end of neck 11, the cap is in complete sealing engagement with the bottle 10, and the threads 21 and 18 cannot be slipped. Therefore, the disclosed bottle and cap arrangement are suitable for holding liquids as well as material in powder or tablet form.

With the arrangement disclosed, it will be seen that in an automatic processing line for filling and capping bottles, the locking member 14 may be dropped over the neck of the bottle at one station and will be self-seating on neck 11 and angularly fixed with respect thereto by the splines 13 extending into recesses 15a. At a subsequent work station, the desired contents of the bottle may be placed therein, and then at a still subsequent station, the cap 19 is screwed on to the bottle 10 and the bottle with contents therein and safety cap locked thereon is then arranged for shipment to the user. The disclosed arrangement thus lends itself very readily to processing lines in which bottles are filled and capped automatically without requiring any additional hand labor.

Figure 7:
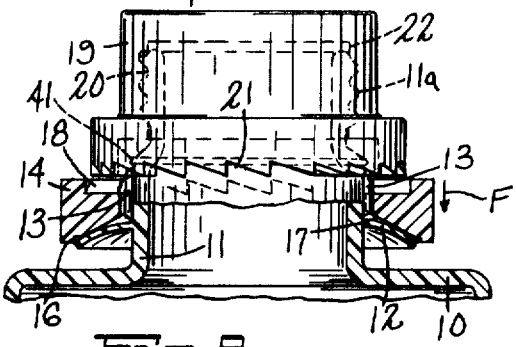
FIG. 7 is a view similar to FIG. 1 but showing the manner in which the locking member may be removed from interlocking engagement with the cap.

For convenience, the locking member 14 is formed with a greater diameter as shown or, alternatively, may be formed at the same diameter as the lower portion of cap 19 with finger projections (not shown) thereon so that while the bottle is held in the palm of the hand, the thumb and a finger may grasp the member 14 and depress it as shown in FIG. 7.

Figure 8:
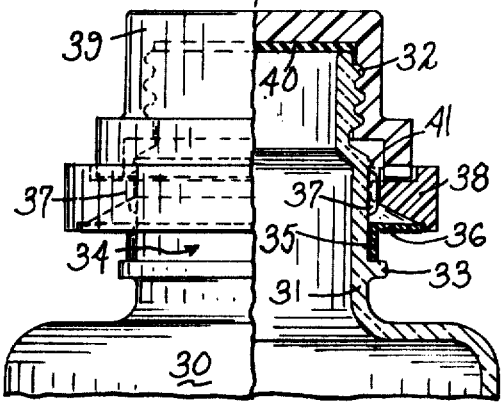
FIG. 8 is a view similar to FIG. 1 but showing the invention as applied to a glass bottle.
Figure 9:
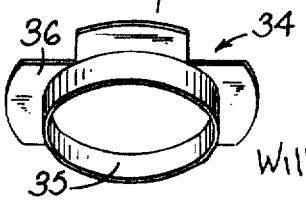
FIG. 9 is a view in perspective of a member used in the assembly of FIG. 8.

The invention is further adaptable for use with glass bottles. FIG. 8 discloses a glass bottle 30 having a neck portion 31 threaded at the upper portion thereof as indicated by the reference numeral 32. The glass bottle 30 is formed with the usual transfer bead 33 which may be radially extended if deemed necessary. As is well known in the glass bottle forming art, a transfer bead 33 is utilized in the molding operation to control the amount of glass in the threaded portion. A member 34 having a sleeve portion 35 and a radially extended flange 36 is placed over neck 31 with the lower edges of the sleeve portion 35 resting on transfer bead 33. The flange[s] 36 may be a disc, or may be segmented *into flanges*, as shown. The configuration of the flanges is not important so long as they provide the necessary biasing function. The member 34 is preferably formed of a material having the previously desired characteristics as, for example, the aforementioned polypropylene.

Also formed on the outer periphery of neck 31 are splines 37 adapted to hold a locking member 38 in fixed angular relationship to neck 31 as previously described. The locking member 38 may be identical in structure to locking member 14 of FIGS. 1–7. A cap member 39 carrying a sealing member 40 is disposed on threads 32 and in locking engagement with member 38 as shown in FIG. 8. The operation for closing and opening the bottle of FIG. 8 is the same as that previously described.

A small detent ring 41 may be formed on either of bottles 10 or 30 to prevent member 14 or 38, respectively, from sliding off the necks if the bottle is held in a completely vertical, upside down position. This ring, if used, is so dimensioned that the locking member and the resilient member 36 may be easily pushed thereover in initial assembly.

It may thus be seen that the objects of the invention set forth as well as those made apparent from the preceding description are efficiently attained. Other embodiments of the disclosed invention, as well as modifications to the disclosed embodiment may occur to those skilled in the art. Accordingly, the appended claims are intended to cover all embodiments of the invention and modifications of the disclosed embodiments thereof which do not depart from the spirit and scope of the invention.

*I* [We] claim:

1. In combination, a bottle having a neck portion and being threaded along said neck portion [to receive a closure cap, a], *a closure cap removably engageable to the threaded neck portion, a* resilient biasing member *in essentially a radial plane spaced from the base of the neck and at a location axially below the region of threaded engagement to said cap, said biasing member including a part fixedly related to said neck portion and a resilient part integrally formed with said first-mentioned part,* [carried on said neck portion and extending radially outwardly therefrom,] a locking member disposed about said neck portion and engaging said resilient [member] *part* adjacent its lower portion, means defined on said locking member and said cap for interlocking engagement therebetween, said member upon tightening of said cap on said neck forcing said resilient member downwardly whereby said resilient member biases said locking member toward said interlocking engagement.

[2. The combination of claim 1 further defined in that the bottle is formed of a resilient material and said biasing member is a flange integrally formed on said neck.]

3. The combination of claim 1 further including splinelike members on said neck above said biasing member, said locking member fitting over said splines to render said locking member nonrotational with respect to said neck.

4. The combination of claim 1 wherein said interlocking means comprise mating ratchetlike teeth defined on said locking member and said closure cap, said teeth being arranged to permit slippage therebetween as said closure cap is threaded onto said neck and prevent rotation of said cap from said neck when said locking member is biased against said cap.

5. The combination of claim [2] *13* wherein said locking member is annular in shape and the underside thereof is defined with a concavity so that said locking member may act on the outer edges of said flange *member* and move downwardly with respect thereto.

6. The combination of claim 3 wherein said locking member defines an opening for receiving said neck therethrough, a plurality of angularly spaced detent elements extending radially inwardly of said opening and defining spaces therebetween adapted to receive said splines.

7. The combination of claim 1 wherein said bottle is formed of glass and said biasing member is of a resilient material disposed about the neck of said bottle.

[8. The combination of claim 7 wherein the neck portion of said bottle is formed with a flangelike bead, said biasing member includes a sleevelike portion resting on said bead and having a resilient radially extending flange.]

9. The combination of claim 7 further including splinelike members on said neck above said biasing member, said locking member fitting over said splines to render said locking member nonrotational with respect to said neck.

10. The combination of claim [8] *14* wherein said interlocking means comprise mating ratchetlike teeth defined on said locking member and said closure cap, said teeth being arranged to permit slippage therebetween as said closure cap is threaded onto said neck and prevent rotation of said cap from said neck when said locking member is biased against said cap.

11. The combination of claim [8] *14* wherein said locking member is annular in shape and the underside thereof is defined with a concavity so that said locking member may act on the outer edges of said flange and move downwardly with respect thereto.

12. The combination of claim 7 wherein said locking member defines an opening for receiving said neck therethrough, a plurality of splines defined on the neck of said bottle and a plurality of angularly spaced detent element extending radially inwardly of said opening and defining spaces therebetween adapted to receive said splines.

*13. In combination, a bottle of resilient material having a neck portion and being threaded along said neck portion, a closure cap removably engageable to the threaded neck portion, a resilient biasing flange member integral with said neck portion and extending radially outwardly therefrom, a locking member disposed about said neck portion and engaging said resilient member adjacent its lower portion, means defined on said locking member and said cap for interlocking engagement therebetween, said member upon tightening of said cap on said neck forcing said resilient member downwardly whereby said resilient member biases said locking member toward said interlocking engagement.*

*14. In combination, a glass bottle having a threaded neck portion and a retaining bead near but spaced from the base of said neck portion, a closure cap removably engageable to the threaded neck portion, a resilient biasing member carried on and disposed about said neck portion and extending radially outwardly therefrom, said biasing member including a sleevelike portion resting on said bead, a locking member disposed about said neck portion and engaging said resilient member adjacent its lower portion, means defined on said locking member and said cap for interlocking engagement therebetween, said member upon tightening of said cap on said neck forcing said resilient member downwardly whereby said resilient member biases said locking member toward said interlocking engagement.*

*15. In combination, a bottle having a neck member and being threaded along said neck member, a closure cap removably engageable to the threaded neck member, a locking member disposed outside said neck member and beneath the threaded region thereof, axially resilient biasing means formed integrally with one of said members and extending into engagement with the other of said members, said biasing means being in essentially a radial plane spaced from the base of said neck member and at a location axially below the region of threaded engagement to said cap, and means defined on said locking member and said cap for interlocking engagement therebetween, said locking member upon securing said cap on said neck forcing said resilient biasing means downwardly whereby said locking member is biased toward said interlocking engagement, there being sufficient clearance for further downward deflection of said biasing means to disengage said interlocking engagement to enable cap removal from the secured position thereof.*

*16. The combination of claim 15, in which said biasing means is carried by said neck member.*

*17. In combination, a bottle including an externally threaded neck member, an internally threaded cap removably engageable to the threaded neck member, a locking-ring member disposed about said neck member and nonrotatably associated with said neck member beneath the threaded region thereof, axially resilient biasing means formed integrally with one of said members and extending radially into engagement with the other of said members, said biasing means being in essentially a radial plane spaced from the base of said neck member and at a location axially below the region of threaded engagement to said cap, and means defined on said locking-ring member and on said cap for interlocking engagement therebetween, said biasing means being downwardly deflected and therefore resiliently biasing said interlocking engagement when said cap is threadedly secured to said neck member, there being sufficient clearance for further downward deflection of said biasing means to disengage said interlocking engagement to enable cap removal from the secured position thereof.*

*18. The combination of claim 17, in which said locking-ring member is separate from said neck member, and in which spline means interengage said members to provide said non-rotatable association.*

*19. In combination, a bottle including an externally threaded neck member, an internally threaded cap removably engageable to the threaded neck member, a locking-ring member disposed about said neck member and nonrotatably associated with said neck member beneath the threaded region thereof, axially resilient radially extending biasing means having inner and outer radial limits, said biasing means at one radial limit being formed integrally with one of said members and at the other radial limit being axially referenced to the other of said members, and means defined on said locking-ring member and on said cap for interlocking engagement therebetween, said biasing means being in essentially a radial plane spaced from the base of said neck member and at a location axially below the region of threaded engagement to said cap, said biasing means being downwardly deflected and therefore resiliently biasing said interlocking engagement when said cap is threadedly secured to said neck member, there being sufficient clearance for further downward deflection of said biasing means to disengage said interlocking engagement to enable cap removal from the secured position thereof.*

*20. In combination, a bottle including an externally threaded neck, a closure cap removably engageable to the threaded neck, axially resilient biasing means including an integral ring engaged to said neck at a location axially below the region of threaded engagement to said cap, an axially resilient member integral with said ring, and locking means axially positioned by said axially resilient member, said resilient member being in essentially a single radial plane spaced from the base of said neck and at a location axially below the region of threaded engagement to said neck, said cap having a locking formation adapted for interlocking engagement with said locking, means, said locking means upon securing said cap on said*

*neck forcing said resilient member downwardly, whereby said locking means is biased toward said interlocking engagement, there being sufficient clearance for further downward deflection of said biasing means to disengage said interlocking engagement to enable cap removal from the secured position thereof.*

*21. The combination of claim 20, in which said interlocking engagement is one-way, being antirotational in the cap-unthreading direction.*

*22. In combination, a bottle including an externally threaded neck, a closure cap removably engageable to the threaded neck, axially resilient biasing means including an integral ring engaged to said neck at a location axially below the region of threaded engagement to said cap, said biasing means including an axially resilient portion radially offset outward of said neck, said biasing means being in essentially a radial plane spaced from the base of said neck and at a location axially below the region of threaded engagement to said cap, and locking means axially resiliently positioned by said offset portion of said biasing means, said cap having a locking formation adapted for interlocking engagement with said locking means, said locking means upon securing said cap on said neck forcing said resilient biasing means downwardly, whereby said locking means is biased toward said interlocking engagement, there being sufficient clearance for further downward deflection of said biasing means to disengage said interlocking engagement to enable cap removal from the secured position thereof.*

*23. In combination, a bottle of plastic material including an externally threaded neck, a closure cap removably engageable to the threaded neck, axially resilient biasing means integrally formed with said neck and extending radially outwardly at a location axially below the region of threaded engagement with said cap, and locking means axially positioned by an outwardly extending portion of said biasing means, said cap having a locking formation adapted for interlocking engagement with said locking means, said locking means upon securing said cap on said neck forcing said resilient biasing means downwardly, whereby said locking means is biased toward said interlocking engagement, there being sufficient clearance for further downward deflection of said biasing means to disengage said interlocking engagement to enable cap removal from the secured position thereof.*

*24. In combination, a bottle including an externally threaded neck, a closure cap removably engageable to the threaded neck, axially resilient biasing means in essentially a radial plane spaced from the base of the neck and at a location axially below the region of threaded engagement to said cap, said biasing means including an integral ring engaged to said neck, said biasing means including angularly spaced axially resilient radially outward members integral with said ring, and locking means axially positioned by an outwardly extending portion of said biasing means, said cap having a locking formation adapted for interlocking engagement with said locking means, said locking means upon securing said cap on said neck forcing said resilient biasing means downwardly, whereby said locking means is biased toward said interlocking engagement, there being sufficient clearance for further downward deflection of said biasing means to disengage said interlocking engagement to enable cap removal from the secured position thereof.*

*25. In combination, a bottle including an externally threaded neck, a closure cap removably engageable to the threaded neck, axially resilient biasing means including an integral ring engaged to said neck at a location axially below the region of threaded engagement to said cap and spaced from the base of said neck, a single continuous radially outward flange member intergral with said ring, and locking means axially positioned by an outwardly extending portion of said biasing means, said cap having a locking formation adapted for interlocking engagement with said locking means, said locking means upon securing said cap on said neck forcing said resilient biasing means downwardly, whereby said locking means is biased toward said interlocking engagement, there being sufficient clearance for further downward deflection of said biasing means to disengage said interlocking engagement to enable cap removal from the secured position thereof.*

References Cited

The following references, cited by the Examiner, are of record in the patented file of this patent or the original patent.

UNITED STATES PATENTS

| | | | |
|---|---|---|---|
| 3,200,979 | 8/1965 | Powers | 215—9 |
| 3,510,021 | 5/1970 | Silver | 215—9 |
| 3,344,942 | 10/1967 | Hedgewick | 215—9 |
| 3,410,434 | 11/1968 | Simmons | 215—9 |
| 3,468,444 | 9/1969 | Martin | 215—9 |
| 3,472,411 | 10/1969 | Turner | 215—9 |

GEORGE T. HALL, Primary Examiner

U.S. Cl. X.R.

215—95